Aug. 21, 1934.                F. F. FORSHEE                1,971,136
                            RANGE CONTROL SYSTEM
                             Filed Jan. 14, 1932
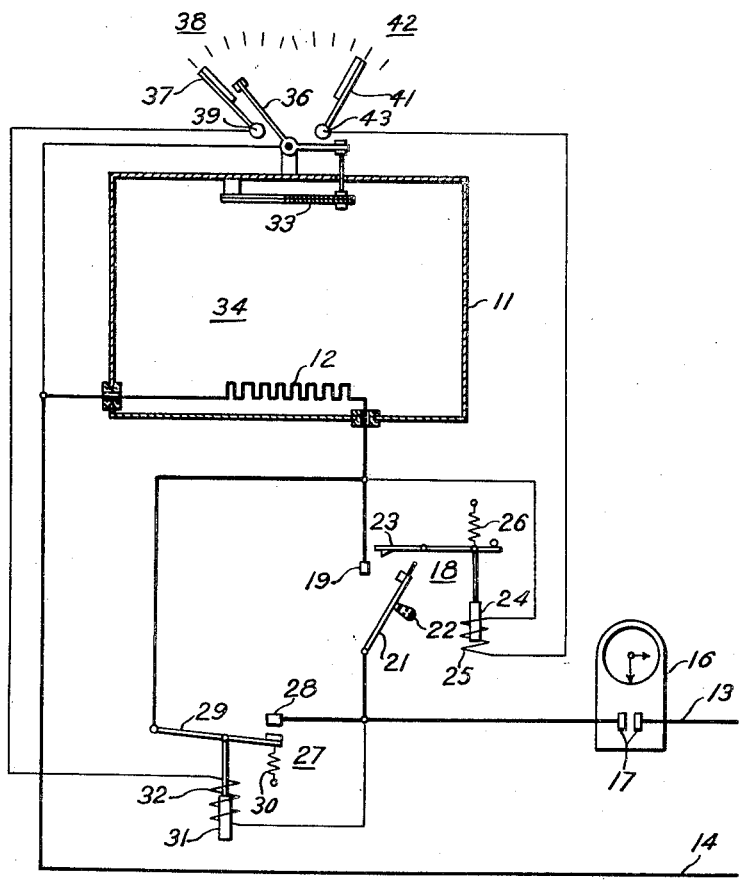
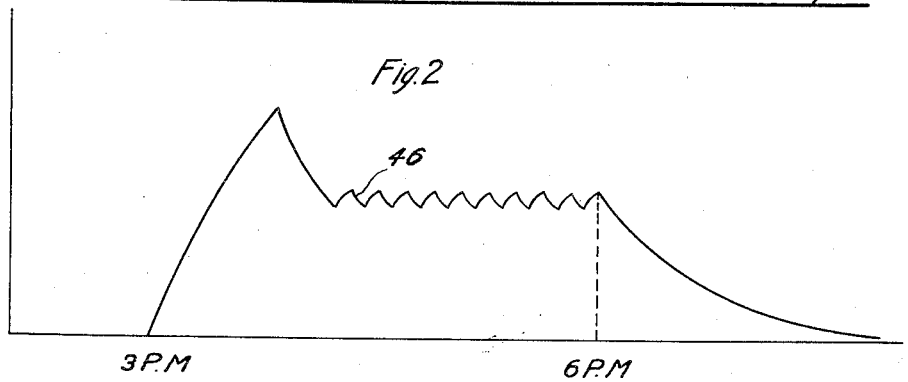
WITNESSES:                                              INVENTOR
                                                    Frank F. Forshee.
                                                    BY
                                                        ATTORNEY Patented Aug. 21, 1934

1,971,136

UNITED STATES PATENT OFFICE

1,971,136

RANGE CONTROL SYSTEM

Frank F. Forshee, Mansfield, Ohio, assignor to Westinghouse Electric & Manufacturing Company, a corporation of Pennsylvania Application January 14, 1932, Serial No. 586,570

8 Claims. (Cl. 219—20)

My invention relates to temperature control systems for the treatment of materials of and particularly to time and temperature control systems for cooking purposes.

An object of my invention is to provide apparatus for practicing a relatively simple and effective time and temperature control of electric cooking.

In order to more clearly set forth my invention and to point out its novelty and value, I wish to refer briefly to the ordinary methods of cooking certain classes of food, more particularly, roast meats, as has been the practice for many years.

It is now generally agreed that in the roasting of meats, they should be subjected to a relatively high temperature, on the order of 450° F., in the early part of the roasting operation and for a very short period of time only, for the purpose of congealing the juices in the meat and for browning the outside surface thereof. It has also been proven that when the juices have been congealed and the outer surface has been browned, a material reduction in the roasting temperature, to about 250° F. to 300° F., is necessary and that this lower temperature should continue for the remainder of the roasting period. This reduction in the roasting temperature results in a marked improvement in the flavor, in the retention of the juices, and also reduces the loss in weight caused by shrinkage. The total time for the roasting operation is determined by the weight of the piece of meat and also by the desired degree of roasting, that is whether rare, medium or well-done.

A large number of tests made by different experimenters has demonstrated that a cooking cycle of the above described kind will produce the most satisfactory results. However, in all of these tests the adjustments as to time and temperature were made manually thus requiring a large amount of time and attention on the part of the operator.

None of the automatic control systems now known and used are such as to provide this optimum cycle and hence it is also an object of my invention to provide a relatively simple apparatus for practicing an optimum cycle for roasting meat that shall require a minimum amount of attention on the part of an operator and that shall be easily and quickly adjustable for different weights of roasts or other foods.

In contradistinction to the older control systems, my improved automatic time and temperature control system permits of placing a piece of meat or other food in a cold oven, heating the same to a relatively high predetermined temperature, on the order of 500° F., then allowing the temperature to fall to a lower predetermined value, which is then maintained for a predetermined length of time, after which the meat or other food is ready for serving.

In practicing my invention, I provide a time-controlled switch in combination with one or more electromagnetic circuit breakers or circuit-controlling devices, and a thermostat controlled by the temperature of the cooking chamber for effecting the different steps of the cooking cycle.

In the single sheet of drawings:

Figure 1 illustrates, schematically, a control system for practicing my invention, and Fig. 2 is a time-temperature curve obtained with my invention.

An oven indicated generally by the numeral 11 has a heating element 12 therein in the shape of an electric resistance which may be energized through suitable controlling means from a source of supply including supply circuit conductors 13 and 14.

A mechanical means such as a time clock indicated by 16 may be preset to cause engagement of the cooperating contact members 17 actuated thereby, at any desired future time and will then maintain them in engagement for a second predetermined time, after which they will be disengaged to open the circuit.

An electromagnetic relay 18 includes a stationary contact member 19, a contact arm 21, which may be moved to its closed position manually as by a knob or handle 22 of electric-insulating material, the arm 21 being held in its closed position by an electro-magnetically controlled latch 23 having pivotally secured thereto a core member 24, energizable by a coil 25. A spring 26 holds the latch 23 in the position shown in the drawing, from which it may be moved by energization of the coil 25 and core 24.

A second electro-magnetic relay 27 includes a fixed contact member 28 and a pivotally mounted contact arm 29 having a retracting spring 30 and a core member 31 associated therewith which is energizable by a coil 32. The construction of relay 27 is such that the contact arm and fixed contact member are normally disengaged. The cooperating contact arms and contact members are electrically connected in parallel-circuit relation relative to each other.

A bimetal thermostat 33 is located preferably within the oven chamber 34 and actuates a pivotally mounted contact arm 36. A manually-adjustable contact arm 37 is provided at one side of the movable arm 36 which, as shown in the drawing, is adapted to be moved in accordance with the temperature, and, therefore, of the deflection of the free end of bimetal bar 33. The movable end of arm 37 cooperates with a scale 38 which may be calibrated in degrees of temperature, and the arm 37 may be adjusted by a knob 39 to move it to any predetermined position corresponding to a desired operating temperature.

A second manually-adjustable arm 41 is provided on the other side of movable arm 36, the free end cooperating with a second scale 42, the arm 41 being adjustable by a knob 43. It is to be understood that both manually-adjustable arms may be set at any desired point or reading on the respective scales, regardless of whether the arm 36 is engaged thereby or not. The positions of the arm 36 and of the bimetal bar 33 shown in the drawing are those for room temperature.

The connections will be more particularly set forth in describing the operation, which operation is substantially as follows: The adjustable arm 37 is what may be termed the maintained-temperature arm and the arm 41 is the maximum momentary-temperature arm. Let it be assumed that we desire to heat the oven chamber and at least the exterior portion of a piece of meat or other food located in chamber 34, to a temperature of 500° F. then immediately reduce and maintain the temperature at, say, 300° F. for a predetermined length of time. The arm 41 is set to correspond to 500° F., and the arm 37 is set to correspond to 300° F. on the respective scales. The friction in the pivotal mountings is large enough to hold each arm in its adjusted position, the bimetal bar 33 being bent by the movement of arm 37. A predetermined total length of time will be required for properly cooking to the desired degree, a piece of meat of a certain kind and of a certain weight. For purposes of illustration, let it be assumed that the roast is to be served at six o'clock and that all preliminary preparations are to be effected at one o'clock, while it will require a total of three hours elapsed time to properly cook the roast which is to be served at six o'clock. The operator will set one of the hands of the time switch 16 so that the contact members 17 will be closed at three o'clock and will then set another hand or adjustment on the clock to effect disengagement of the contact members three hours after they have been caused to engage. The operator will further manually close circuit interrupting device 18 by pushing on knob 22 to thereby cause engagement of arm 21 with contact member 19. At the same time, of course, the piece of meat is placed in the oven.

Two hours after the initial time of one o'clock, which was assumed, clock 16 will cause engagement of contact members 17 and an energizing circuit will be provided which may be traced from conductor 13 through the time switch contacts 17, the main contacts 19 and 21 of relay 18, the heating element 12 and back to the other supply circuit conductor 14. It is, of course, obvious that the contact members on arms 36 and 37 will be in engagement for the reason that arm 37 was moved to a position corresponding to 300° oven chamber temperature and that, for the time between one and three o'clock, the temperature of the oven chamber will be substantially the same as that of the outside atmosphere or in the neighborhood of, say, 70° F. Simultaneously, with the closing of the circuit by the clock 16 at contact members 17, coil 32 of relay 27 was energized, the circuit extending from conductor 14, arm 36, arm 37, coil 32 and through clock contacts 17 to supply circuit conductor 13. This causes engagement of contact arm 29 with contact 28, but, as these two elements are in parallel with contact member 19 and contact arm 21, no further result is effected as far as the control system itself is concerned.

The temperature of the oven chamber, and, therefore, of at least the external portion of the meat, is raised and the length of time required to raise the temperature to 300° F. will, of course, depend upon a number of conditions, among which is the amount of energy translated into heat in resistor 12, but eventually the temperature of bimetal member 33 will reach 300° F. and slightly over, so that arm 36 will be caused to move to the right, as shown in the drawing, to disengage contact arm 37. This has the result that circuit to coil 32 is interrupted and contact arm 29 is moved to the position shown in the drawing to be thereby disengaged from contact member 28. This action also has no effect upon the cooking operation for the moment.

The temperature in the oven chamber and, therefore, of the bimetal member 33 continues to increase and will ultimately reach 500°, when the arm 36 will engage arm 41, thereby energizing coil 25 of relay 18 and actuating the lever latch 23 to cause contact arm 21 to open and interrupt the energizing circuit through heating element 12. The arm 21 will thereafter remain in "open" position and will be ineffective to further control the heating element 12, until reset or reclosed by the operator.

The deenergization of heating element 12 permits the temperature in the oven chamber 34 to drop quickly and the arm 36 will, of course, be actuated in accordance with this temperature so that, as the temperature decreases, the arm 36 will be moved toward the left and, at a temperature of 300°, it will engage contact arm 37. When this occurs, coil 32 of relay 27 is again energized, causing arm 29 to engage contact 28 and thereby reenergizing heating element 12. The reenergization of heating element 12 causes an increase in the temperature of the oven chamber and, therefore, of the bimetal element 33, with the result that arm 36 is again moved to the right, disengaging itself from arm 37, which results in again deenergizing resistor 12. In other words, control of the heating element 12 has been shifted from relay 18 to relay 27, after relay 18 operated once to interrupt the circuit of the heating element.

It is obvious that, as long as the cooperating contact members 17 are in engagement as controlled by the clock 16, the movement of arm 36 in accordance with temperature changes of bimetal element 33 will continue and the temperature in the oven chamber will, therefore, vary only slightly from an average value of 300° F., which operation will continue until at six o'clock, as was determined by the initial setting of the time clock by the operator, contact members 17 will be caused to disengage and finally deenergize heating element 12. A time-temperature curve 46 of this general kind is shown in Fig. 2 and it is to be noted particularly that the maximum temperature is not maintained for an appreciable length of time, but is momentary only, while the sustained lower temperature is maintained for a relatively long period of time.

It will thus be seen that all an operator needs to do is, knowing the total length of time which must elapse for the given size and kind of roast to be cooked between the time of initially energizing the heating element and of finally deenergizing it, to make the proper adjustments on the thermostat for the maximum momentary temperature and the sustained temperature, after which the setting of the clock for the required times, is all that is necessary to carry into effect the desired cycle of full automatic cooking operations.

I have personally made a large number of tests on a cycle of this kind and have found that a roast cooked in this manner is much more palatable, and retains its juices with less loss in weight than has been the case with other cycles of cooking which I have used. I believe that this is mainly because the maximum temperature to which the meat is subjected momentarily is such as to draw out small quantities of juice from the meat and to cause what I prefer to call "congealing" thereof at the outside of the meat. I believe that these congealed juices are reabsorbed to some extent during the longer low-temperature period of operation in the latter part of the cooking cycle, thereby resulting in a greatly improved flavor in the entire roast. Once the optimum temperature has been determined for a given kind of meat, a system embodying my invention will permit of duplicating this optimum temperature each time that it is used. I have found it possible to cook a roast which will have a very thin outer layer of seared meat while substantially the entire inner portion thereof, with the exception of the outer ⅛ inch thickness, is substantially uniform and relatively light in color.

The device and system embodying my invention may be used also to obtain selectively two other time and temperature control cycles, as follows: Set the arm 37 to say 300° or for a desired temperature which is to be maintained. Set the arm 41 to some higher temperature on scale 42—say 400°. Do not actuate arm 21 to engage contact member 19. Adjust the clock 16 for the desired times of closing the energizing circuit through element 12 and for effecting deenergization thereof, in accordance with the weight of the food, its character and perhaps other details.

When the contact members 17 are caused to engage, at the desired time, the heating element 12 is energized through contacts 28 and 29 which are caused to engage by the energized coil 32 of relay 27. As soon as the temperature has reached the value of 300°, the engagement between arm 36 and contact member 37 will be interrupted, so that coil 32 is deenergized thus causing disengagement of contact members 28 and 29. The temperature in the cooking chamber 34 will then decrease, so that arm 36 will again engage contact member 37 to effect reenergization of the heating element to again cause an increase in the temperature in the cooking chamber, this sequence of operations being continued until the clock effects disengagement of contact members 17 to finally deenergize the heat element. This is what may be called the "sustained temperature" cycle of cooking.

Another cycle of operation obtainable by my system and device is as follows: Set arm 37 below room temperature and set arm 41 at, say, 500° and move arm 21 to its closed position. Set the clock 16 to cause engagement of contact members 17 at a predetermined time and to cause disengagement thereof at some predetermined later time. When contacts 17 are caused to be engaged by the clock, heating element 12 is energized through contact members 19 and 21 only and the temperature of the cooking chamber will rise. The temperature in the cooking chamber will increase and when arm 36 engages contact member 41 (as it will when the temperature in the cooking chamber reaches 500°) coil 25 of relay 18 is energized thereby causing disengagement of arm 21 from contact member 19, whereby the heating element 12 is deenergized and remains deenergized while the temperature in the cooking chamber will be continuously reduced. This cycle is, therefore, one in which the temperature in the cooking chamber is raised to a predetermined value, the heating element is then deenergized and the cooking operation is continued by stored heat. In this cycle there is no "sustained temperature" operation.

It is obvious also that the heating appliance may be operated to practice any one of the three cycles of temperature control omitting the action of the clock mechanism. Thus, it is possible to disconnect the clock and its switch from the circuit or to so adjust the hands of the clock that switch contact members 17 are in engagement during the entire time of operation of the heating appliance. The operator can then manipulate the other elements of the control system, as has already been set forth at the proper time and energization of the heating element will start at once and progress in the selected manner. If one of the sustained temperature cycles is practiced, the operator can finally deenergize the heating element either by means of the clock or by moving the arm 37 to the extreme left.

The device and system embodying my invention thus provide a relatively simple and easily operated means for practicing the optimum cooking cycle for roasting meats, as well as for practicing other related cooking cycles.

Various modifications may be made in my invention without departing from the spirit and scope thereof, and I desire, therefore, that only such limitations shall be placed thereon as are imposed by the prior art or are set forth in the appended claims.

I claim as my invention:

1. In an electric cooking appliance including a cooking chamber and a heating element therefor, temperature-actuated control means electrically connected to the heating element including a manually closable and electro-magnetically-openable circuit breaker and an electro-magnetically-actuable circuit breaker, said breakers being connected in parallel circuits, a thermally-actuable contact arm and a pair of manually-adjustable contact arms electrically connected in circuit with the respective circuit breakers, said contact arms cooperating with the circuit breakers to effect energization of the heating element until the cooking chamber reaches a predetermined higher temperature as fixed by the setting of one of the manually adjustable contact arms, to then immediately deenergize the heating element, reenergize the heating element when the temperature of the cooking chamber has dropped to a second lower value as fixed by the setting of the second manually adjustable arm and then intermittently energize the heating element to maintain substantially said second lower temperature.

2. In an electric cooking appliance including a cooking chamber, a heating element therefor and circuit-controlling means comprising a manually-movable switching device for the heating element, means for controlling said circuit-controlling means, said last-named means including a manually-adjustable peak temperature contact arm, a manually-adjustable maintained temperature contact arm, a thermally actuable contact movable in response to temperature changes in the cooking chamber and electric connections between the circuit controlling means and said contact arms, movement of the maintained temperature contact arm to cooperate with the thermally actuable contact when the manually movable switching device is in circuit closing position effecting energization of the heating element to obtain a peak temperature in the cooking chamber, and effecting deenergization of the heating element when the peak temperature has been reached and until the chamber temperature has dropped to a predetermined lower value, the cooperation of the maintained temperature contact arm and the thermally actuable contact being effective thereafter to hold said chamber temperature at substantially the maintained value, and the manually movable switching device and the manually-adjustable maintained temperature contact arm being selectively movable whereby when the maintained temperature contact arm is moved out of operative relation to the thermally actuable contact and said manually movable device is moved to circuit-closing position, said heating element is energized until a peak temperature is reached in the cooking chamber and is then deenergized.

3. In an electric cooking appliance including a cooking chamber, a heating element therefor and circuit-controlling means comprising a manually-movable switching device for the heating element, means for controlling said circuit-controlling means, said last-named means including a manually-adjustable peak temperature contact arm, a manually-adjustable maintained temperature contact arm, a thermally actuable contact movable in response to temperature changes in the cooking chamber and electric connections between the circuit-controlling means and said contact arms, movement of the maintained temperature contact arm to cooperate with the thermally actuable contact when the manually-movable switching device is in circuit closing position effecting energization of the heating element to obtain a peak temperature in the cooking chamber, and effecting deenergization of the heating element when the peak temperature has been reached and until the chamber temperature has dropped to a predetermined lower value, the cooperation of the maintained temperature contact arm and the thermally-actuable contact being effective thereafter to hold said chamber temperature at substantially the maintained value, movement of the maintained temperature contact arm to cooperate with the thermally actuable contact and movement of the manually-movable switching device to circuit-opening position effecting an intermittent make and break of the circuit to the heating element to maintain a substantially constant lower maintained temperature in the cooking chamber.

4. In an electric cooking appliance including a cooking chamber and a heating element therefor, a manually-adjustable peak temperature contact means, a manually-adjustable maintained temperature contact means, a temperature controlled contact means operably responsive to the chamber temperature, electric conductors associated with said temperature controlled contact means and said other contact means respectively, and circuit controlling means operatively associated with said temperature controlled contact means, said manually-adjustable contact means and said conductors, said circuit controlling means including a manually closable and electromagnetically openable circuit breaker and an electrically actuable circuit breaker, said first circuit breaker being operable to deenergize the heating element upon engagement of the temperature controlled contact means and the peak temperature means and said last-named circuit breaker being operable upon engagement of the temperature controlled contact means and the maintained temperature contact means to intermittently sequentially energize and deenergize the heating element.

5. In an electric cooking appliance including a cooking chamber, a heating element therefor, a manually-adjustable peak-temperature arm, a manually-adjustable maintained-temperature arm, an arm movable in response to variations in chamber temperature, electric conductors associated with certain of said arms, and circuit control means for the heating element operatively associated with said arms and said conductors, said circuit control means being operably responsive to the cooperation of the temperature movable arm with the peak temperature arm to deenergize the heating element and being further operable by the cooperation of the temperature movable arm with the maintained temperature arm to intermittently sequentially energize and deenergize the heating element.

6. In an electric cooking appliance including a cooking chamber, a heating element therefor, a manually-adjustable peak temperature contact arm, a manually-adjustable maintained temperature contact arm, a temperature controlled contact arm operably responsive to the chamber temperature, electric conductors associated with said temperature controlled arm and said other contact arms respectively, and means operatively associated with said temperature controlled arm, said manually adjustable contact arms and said conductors, said means being operable to deenergize the heating element upon engagement of the temperature controlled contact arm and the peak temperature arm and being further operable upon engagement of the temperature controlled contact arm and the maintained temperature arm to intermittently energize the heating element.

7. In an electric cooking appliance including a cooking chamber, a heating element therefor, and circuit controlling means for the heating element, means for controlling said circuit controlling means, said last-named means including a manually adjustable high temperature contact arm, a manually adjustable maintained temperature contact arm, a thermally actuable contact movable in response to temperature changes in the cooking chamber, and electric connections between the circuit controlling means and said contact arms, said circuit controlling means including a manually movable switching device, said switching device and said manually adjustable maintained temperature arm being selectively movable whereby when the maintained temperature arm is moved out of operative relation to the thermally actuable contact and said manually movable switching device is moved to circuit closing position said heating element is deenergized at a peak temperature; movement of the maintained temperature arm to cooperate with the thermally actuable contact, and movement of said manually movable switching device to circuit opening position permitting an intermittent make and break of the circuit to the heating element to maintain a substantially constant lower maintained temperature in said chamber, or movement of the maintained temperature arm to cooperate with the thermally actuable contact with the manually movable device in circuit closing position permitting energization of the heating element to a peak temperature and deenergization of said heating element when the peak temperature has been reached and until the chamber temperature has dropped to a maintained value, the cooperation of the maintained temperature arm and thermally actuable contact being effective thereafter to hold said temperature at substantially the maintained value.

8. In an electric cooking appliance including a cooking chamber, a heating element therefor, a manually-adjustable peak-temperature contact, a manually-adjustable maintained-temperature contact, a contact movable in response to variations in chamber temperature, electric conductors associated with certain of said contacts, and circuit control means for the heating element operatively associated with said contacts and said conductors, said circuit control means being operably responsive to the cooperation of the temperature movable contact with the peak temperature contact to deenergize the heating element and being further operable by the cooperation of the temperature movable contact with the maintained temperature contact to intermittently sequentially energize and deenergize the heating element.

FRANK F. FORSHEE.